US 12,115,591 B2

(12) United States Patent
Endreß et al.

(10) Patent No.: US 12,115,591 B2
(45) Date of Patent: Oct. 15, 2024

(54) SOLDERING APPARATUS (71) Applicant: ERSA GmbH, Wertheim (DE)

(72) Inventors: Lothar Endreß, Wertheim (DE);
Benedict Fleischmann, Neubrunn (DE); Alexander Diehm, Wertheim (DE)

(73) Assignee: ERSA GmbH, Wertheim (DE)

( * ) Notice: Subject to any disclaimer, the term of this patent is extended or adjusted under 35 U.S.C. 154(b) by 82 days.

(21) Appl. No.: 17/983,689

(22) Filed: Nov. 9, 2022

(65) Prior Publication Data
US 2023/0143773 A1 May 11, 2023

(30) Foreign Application Priority Data
Nov. 9, 2021 (DE) ..................... 10 2021 129 122.4

(51) Int. Cl.
*B23K 3/00* (2006.01)
*B23K 1/00* (2006.01)
(Continued)

(52) U.S. Cl.
CPC .............. *B23K 1/0016* (2013.01); *B23K 3/08* (2013.01); *B23K 2101/42* (2018.08)

(58) Field of Classification Search
CPC .................. B23K 1/0016; B23K 3/08; B23K 2101/36–42; B23K 1/20; B23K 37/047;
(Continued)

(56) References Cited

U.S. PATENT DOCUMENTS

| 5,341,978 A | * | 8/1994 | Halstead | ................ B23K 1/008 228/42 |
| 5,364,007 A | * | 11/1994 | Jacobs | ................. B23K 3/0646 219/390 |

(Continued)

FOREIGN PATENT DOCUMENTS

| CN | 88100726 A | * | 8/1988 | ........... B23K 1/0053 |
| CN | 1672005 A | * | 9/2005 | ............. B23K 1/008 |

(Continued)

OTHER PUBLICATIONS

Translated Chinese First Office Action, App. No. 202211389110.2, dated May 29, 2024, entire document.

*Primary Examiner* — Kiley S Stoner
(74) *Attorney, Agent, or Firm* — BOND, SCHOENECK & KING, PLLC; George R. McGuire (57) ABSTRACT Soldering apparatus, in particular a reflow soldering apparatus, for the continuous soldering of printed circuit boards along a transport direction, with an entry and an exit for feeding and removing the printed circuit boards, with a process channel including a preheating zone, a soldering zone and/or a cooling zone, and including a main body and at least one cover hood movable between a closed position and an open position, the cover hood enclosing a hood compartment above the process channel in which fan motors are provided. A central suction channel is provided in the hood compartment, in that the first suction elements connected to the suction channel in the hood compartment are provided for the suction of hood compartment air from the hood compartment, in that second suction elements connected to the suction channel in the hood compartment are provided for the suction of process gas from the process channel, and in that a switching device is provided and is configured to switch between an operating mode in which hood compartment air is suctioned via the first suction (Continued)

elements and a cooling mode in which process gas is suctioned via the second suction elements.

10 Claims, 5 Drawing Sheets

(51) Int. Cl.
   *B23K 3/08* (2006.01)
   *B23K 101/42* (2006.01)
(58) Field of Classification Search
   CPC .. B23K 1/008; B23K 1/012; B23K 1/00–206;
       B23K 3/00–087; H05K 3/34
   USPC ..... 228/179.1–180.22, 218–220, 260, 37, 42
   See application file for complete search history.

(56) References Cited

U.S. PATENT DOCUMENTS

| | | | | |
|---|---|---|---|---|
| 2003/0116352 A1* | 6/2003 | Nakatsuka | ........... | B23K 3/0653 |
| | | | | 174/263 |
| 2003/0218058 A1* | 11/2003 | Shaw | ........... | B23K 1/012 |
| | | | | 228/230 |
| 2004/0211817 A1* | 10/2004 | Jin | ........... | B23K 1/20 |
| | | | | 228/42 |
| 2021/0170514 A1* | 6/2021 | Wang | ........... | B23K 1/008 |

FOREIGN PATENT DOCUMENTS

| | | | | | |
|---|---|---|---|---|---|
| CN | 1902020 | A | | 1/2007 | |
| CN | 101508048 | A | * | 8/2009 | ............ B23K 1/008 |
| CN | 103262670 | A | * | 8/2013 | ............ B23K 1/00 |
| CN | 203380465 | U | * | 1/2014 | |
| CN | 105772886 | A | | 7/2016 | |
| CN | 107186312 | A | * | 9/2017 | |
| CN | 206997977 | U | * | 2/2018 | |
| CN | 108176907 | A | * | 6/2018 | ............ B23K 3/04 |
| CN | 207521847 | U | | 6/2018 | |
| CN | 110385496 | A | * | 10/2019 | ........... B23K 1/0016 |
| CN | 210172742 | U | | 3/2020 | |
| CN | 111037025 | A | * | 4/2020 | ............ B23K 3/00 |
| CN | 111673223 | A | * | 9/2020 | |
| CN | 111843093 | A | * | 10/2020 | |
| CN | 213497028 | U | * | 6/2021 | |
| CN | 213560413 | U | * | 6/2021 | |
| CN | 113245652 | A | * | 8/2021 | |
| CN | 113319395 | A | * | 8/2021 | |
| CN | 113681104 | A | * | 11/2021 | |
| CN | 113714583 | A | * | 11/2021 | |
| CN | 114029581 | A | * | 2/2022 | |
| CN | 114603226 | A | * | 6/2022 | |
| CN | 114700576 | A | * | 7/2022 | |
| CN | 115090980 | A | * | 9/2022 | |
| CN | 217666996 | U | * | 10/2022 | |
| CN | 115383240 | A | * | 11/2022 | ............ B23K 3/00 |
| CN | 116100108 | A | * | 5/2023 | ........... B23K 1/0016 |
| CN | 116160085 | A | * | 5/2023 | |
| CN | 116673564 | A | * | 9/2023 | |
| DE | 102005055283 | A1 | | 5/2007 | |
| DE | 102019125981 | A1 | | 4/2021 | |
| DE | 102019128780 | A1 | | 4/2021 | |
| DE | 102020132792 | A1 | * | 6/2021 | ............ B23K 1/008 |
| EP | 4019141 | A1 | * | 6/2022 | ............ B03C 3/01 |
| GB | 2375975 | A | * | 12/2002 | ............ B01D 46/02 |
| JP | 2007273571 | A | * | 10/2007 | ............ B23K 1/008 |
| JP | 2009260097 | A | * | 11/2009 | |
| JP | 2014135425 | A | * | 7/2014 | |
| JP | 3243124 | U | * | 8/2023 | |
| KR | 101062943 | B1 | * | 9/2011 | |
| WO | WO-2015128994 | A1 | * | 9/2015 | ............ B05C 5/00 |
| WO | WO-2019204623 | A1 | * | 10/2019 | ........... B23K 1/0016 |
| WO | WO-2020046959 | A1 | * | 3/2020 | ............ B23K 1/008 |
| WO | WO-2022251052 | A1 | * | 12/2022 | ............ B23K 3/00 |
| WO | WO-2023009536 | A1 | * | 2/2023 | |

\* cited by examiner

Fig. 9

SOLDERING APPARATUS

CROSS-REFERENCE TO RELATED APPLICATION

The present application relates and claims priority to German Patent Application No. 10 2021 129 122.4, filed Nov. 9, 2021, the entirety of which is hereby incorporated by reference.

BACKGROUND

The invention relates to a soldering apparatus, in particular a reflow soldering apparatus, for the continuous soldering of printed circuit boards along a transport direction, comprising a process channel comprising a preheating zone, a soldering zone and/or a cooling zone, having a main body and a cover hood, wherein the cover hood is displaceable between a closed position in which the process channel is closed and an open position in which the cover hood is open and the process channel is accessible. The cover hood encloses a hood compartment which is located above the process channel and in which in particular fan motors are provided.

By means of reflow soldering apparatuses, so-called SMD components (surface-mounted devices) are soldered onto the surface of printed circuit boards by means of solder paste. The solder paste, which is in particular a mixture of solder metal granules, flux and pasty components, is applied to or printed onto the surface of the printed circuit boards for reflow soldering. The components to be soldered are then set into the solder paste. In the reflow soldering process, the material for soldering, i.e. the assembly consisting of printed circuit board, solder paste and the components to be soldered, is preheated in a preheating zone along the process channel and in a soldering zone heated to a temperature above the melting point of the solder paste. As a result, the solder paste melts and the solder joints are formed. In a cooling zone, if one is present, the material for soldering is cooled until the melted solder solidifies before said material is removed from the reflow soldering apparatus.

DE 10 2019 120 A1, DE 10 2019 125 981 A1 and DE 10 2005 055 283 A1 describe soldering apparatuses for the continuous soldering of printed circuit boards.

In the case of reflow soldering apparatuses, the process channel is generally formed by two channel halves: an upper and a lower channel half. The lower channel half is provided in or on the main body and the upper channel half is provided in or on the cover hood. Further components, such as, for example, nozzle plates, fan units, air channels conducting the process gas, filter elements and/or cooling elements, are generally provided in or on the process channel or in or on the main body and in or on the cover hood. Overall, a desired temperature profile is thus provided in the process channel along the transport direction, wherein the process gas is blown into the process channel, suctioned from said channel, in particular cooled in the cooling zone, cleaned and fed back to the process channel.

In particular when a change of the material for soldering is imminent, it will be necessary to adapt the target temperature profile desired in the soldering apparatus to the changed components to be soldered. It may be necessary here to reduce the temperature within the soldering apparatus and, in particular, within the soldering zone as quickly as possible. To do so, it is known to open the cover hood so that the components forming and surrounding the process channel, in particular the channel halves, the nozzle plates, the transport system, the heating elements and fan motors and/or air channels cool down in the ambient temperature. However, it is disadvantageous that hot process gas here flows out of the soldering apparatus, whereby a high heat input into the space surrounding the soldering apparatus, in particular a production hall, takes place. In addition, cooling also takes a considerable time and is associated with a high noise level. In addition, harmful process gas can pass into the space surrounding the soldering apparatus, in particular into the production hall.

SUMMARY OF THE INVENTION

The object of the invention is to provide a soldering apparatus in which a change of the temperature profile can be effected in a simple manner without the above-mentioned disadvantages occurring.

This object is achieved by means of a soldering apparatus. Consequently, it is provided in particular that a central suction channel is provided in the hood compartment, in which first suction elements connected in the hood compartment to the suction channel are provided in the region of the fan motors for the suction of hood compartment air, that second suction elements connected in the hood compartment to the suction channel are provided for the suction of process gas from the process channel, and that a switching device is provided and designed for switching between an operating mode in which hood compartment air is suctioned via the first suction elements and a cooling mode in which process gas is suctioned via the second suction elements.

By switching between the operating mode and the cooling mode and by providing the first and second suction elements, when the cover hood is closed the soldering apparatus for soldering material for soldering can be operated in the operating mode. In this case, the first suction elements suction from the hood compartment hood compartment air heated by the electric motors. If the soldering apparatus is to be cooled rapidly after completion of a production cycle, it can be switched into cooling mode by hot process gas being suctioned from the process channel via the second suction elements in order to cool the process channel.

Here the central suction channel has a dual function: On the one hand, in the operating mode, the hood compartment in which the fan motors are provided is vented and thus cooled. On the other hand, in the cooling mode, the hot process gas is discharged from the process channel via said mode, whereby rapid cooling of the process channel can be achieved. Due to the fact that the soldering apparatus is not open in the cooling mode, the suctioned hot gas can be discharged via a corresponding exhaust air apparatus or can also be conditioned in such a way that it can be discharged into the ambient air at an appropriate temperature and correspondingly cleaned. The provision of the central suction channel also has the advantage that, in particular in the cooling mode, hot process gas can be suctioned at a high rate from the soldering apparatus, in particular over the entire longitudinal extent of the soldering apparatus. The suction channel is in particular dimensioned such that sufficient gas can be suctioned from the soldering apparatus to achieve a correspondingly rapid cooling.

It is further advantageous if third suction elements are provided and if the switching device is configured such that, in the operating mode, process gas is suctioned from the region of the entry and/or of the exit via the third suction elements and that in the cooling mode no process gas is suctioned via the third suction elements. The switching device consequently not only causes the first and second suction elements to switch on or over or to switch off, but also the third suction elements. In the operating mode, the third suction elements are opened together with the first suction elements and in the cooling mode closed together with the first suction elements.

Advantageously, the suction channel extends substantially parallel to the transport direction and is configured to stiffen the cover hood. The central suction channel consequently has a further function; in the operating mode and in the cooling mode, the hood compartment air or process gas can be suctioned centrally from the soldering apparatus and in addition said central suction channel serves to stabilize and stiffen the cover hood.

It is further advantageous if the first suction elements are designed as suction tubes with suction openings, wherein the suction openings are provided in the region of the underside of the cover hood and in the region of the fan motors.

It is further advantageous if the second suction elements are designed as suction tubes with suction openings, wherein in the closed position of the cover hood the suction openings are located in the region of the process channel.

The suction tubes can each have a tube mouth which opens into the central suction channel. Furthermore, the suction tubes can each have at least one suction opening located within the hood compartment. By the provision of suction tubes, the suction opening can consequently be located where suction is efficient.

It is conceivable here for the first suction elements in the closed position of the cover hood to have a portion extending substantially horizontally and/or transversely to the transport direction and having a plurality of suction openings over its longitudinal extent. This enables a large-area suction in the hood compartment.

Furthermore, it is advantageous if a plurality of second suction elements are provided, the suction openings of which, in the closed position of the cover hood, lie in the region of the process channel or open into the latter. The suction openings can consequently intervene in or adjoin the process channel in order to suction the hot process gas from the process channel. In particular, it is conceivable that the suction openings of the second suction elements are coupled into the respective zone and/or open out between two nozzle plates located in the process channel in order to effect an efficient and non-disruptive suction.

In the closed position of the cover hood, the second suction elements can preferably have a substantially vertically extending end portion with an open free end which is provided in the process channel or adjacent to the process channel. This design has the advantage that the vertical portion can be arranged such that the function of the individual zone is not impaired.

Furthermore, it is advantageous if tube mouths of the first suction elements and tube mouths of the second suction elements in each case open out adjacently into the suction channel, and if the switching device comprises and/or operates closure elements in such a way that in the operating mode the latter close the tube mouths of the second suction elements and in the cooling mode close the tube mouths of the first suction elements. The central suction channel here can have a triangular or polygonal cross-section with adjacent channel walls. Advantageously, a quadrangular cross-section with four channel walls is to be provided. Furthermore, it is advantageous if the tube mouths of at least two suction tubes are provided on adjacent walls. The planes of the respective tube mouths then enclose an angle which is a right angle in the case of a rectangular cross-section of the suction channel. Furthermore, it is advantageous if closure elements are provided in the suction channel which, in a first position, close the one tube mouth, and in a second position the other tube mouth.

The closure elements are preferably designed as pivoting flaps which are pivotable between the respective positions about a pivot axis, which preferably runs parallel to the transport direction.

In this case, it is advantageous if the switching device comprises or operates a controllable actuator and an adjustment mechanism via which several closure elements can be adjusted together. It is conceivable for the actuator to be driven pneumatically or electrically and for a lifting gear and/or a drive shaft to be provided as an adjustment mechanism, by means of which a plurality of pivoting flaps can be pivoted into the respective position. For example, all flaps which lie within a zone of the soldering apparatus can be moved synchronously.

The third suction elements are provided in particular at the entry 12 and at the exit 14 of the soldering apparatus and are in particular designed as suction chambers.

It is further advantageous if suction elements are provided which can be switched between an open position and a closed position and which can be switched or controlled by the switching device such that in the operating mode the suction elements are closed and in the cooling mode the suction elements are open, whereby in the cooling mode ambient air can flow into the soldering apparatus. In this way, in the cooling mode sufficient fresh air can flow from the environment into the machine in order to cool the process channel or the associated components.

As mentioned at the outset, it is advantageous if a suction device connected to the suction channel is provided and is configured to suction process gas in the operating mode and in the cooling mode. The suction device can be integrated into the soldering apparatus or can be realized as a device to be provided separately therefrom. It is further advantageous if a cooling and/or cleaning device is provided for cooling and/or cleaning the process gas suctioned via the suction channel. Cooled and cleaned process gas can then be discharged into the environment of the soldering apparatus.

In order to form the hood compartment, it is particularly advantageous if the cover comprises a frame structure with portal-like frame legs extending transversely to the transport direction, wherein the frame legs each have a first support portion directed toward a hood axis about which the cover hood is pivotable and a second support portion directed vertically downwards and a central portion provided between the support portions, and wherein the suction channel is arranged on the frame legs. Overall, this results in an advantageous stiffening of the cover hood.

BRIEF DESCRIPTION OF THE DRAWINGS

Further details of the invention can be found in the following description, on the basis of which an exemplary embodiment of the invention is described and explained in more detail.

The drawings show.

DETAILED DESCRIPTION

Figure 1:
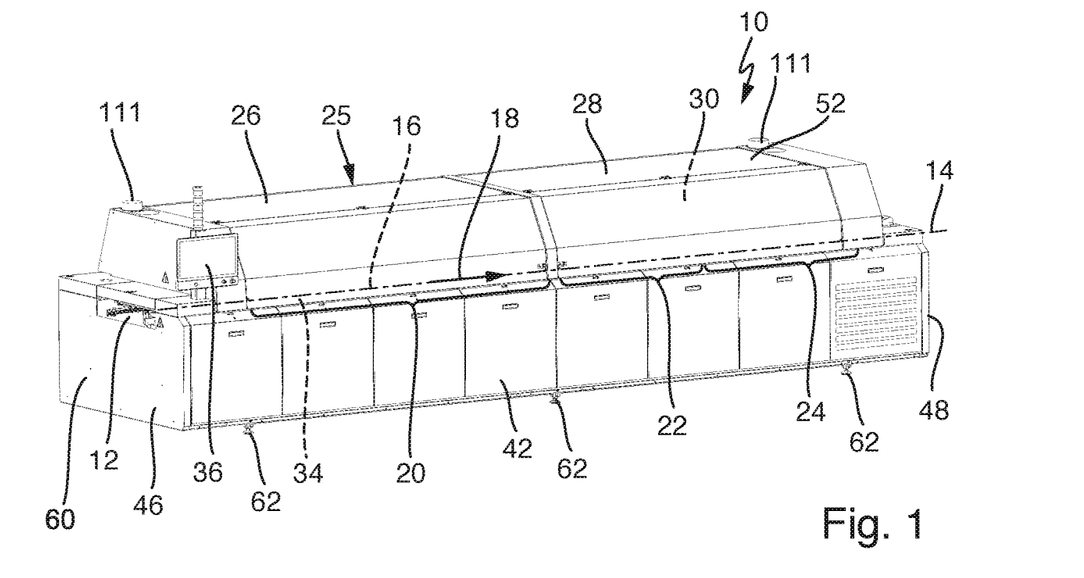
FIG. 1 a reflow soldering apparatus in a side view obliquely from the front with closed cover hood and closed hood flaps.

FIG. 1 shows a reflow soldering apparatus 10 for the continuous soldering of material for soldering. The reflow soldering apparatus 10 has an entry 12 and an exit 14, wherein the material for soldering reaches the reflow soldering apparatus 10 via the entry 12 and is discharged from the reflow soldering apparatus 10 via the exit 14. The material for soldering is transported here along a transport direction 18 through a process channel 16 indicated in FIG. 1.

A preheating zone 20, a soldering zone 22 and a cooling zone 24 are provided in the process channel 16. In the reflow soldering apparatus 10 shown in FIG. 1, a cover hood 25 with two hood flaps 26, 28 is provided for covering the hood compartment 30 enclosed by the cover hood 25, in which compartment the upper channel half of the process channel 16 is located.

Figure 2:
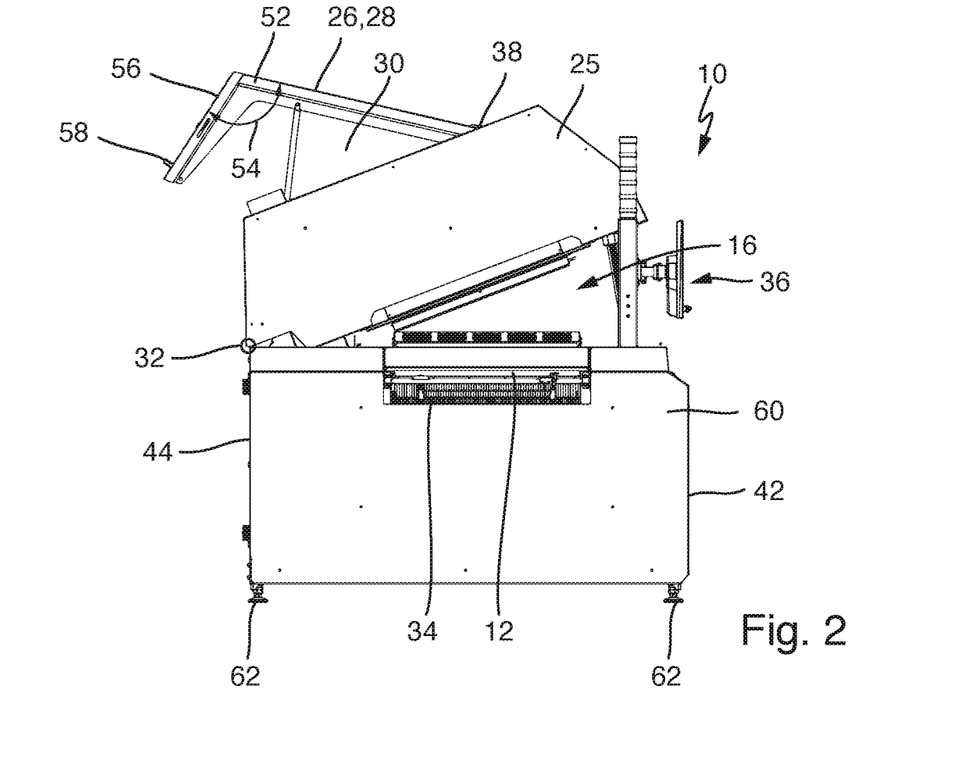
FIG. 2 the reflow soldering apparatus according to FIG. 1 in a front view with open cover hood and opened hood flaps.

As is clear from FIGS. 1 and 2, a communications unit 36 having a screen and an input device is provided, by means of which it is possible to communicate with a machine controller of the reflow soldering apparatus 10.

The material for soldering, that is to say the printed circuit board provided with solder paste and populated with electronic components, is first heated in the preheating zone 20 to a temperature which is below the melting temperature of the solder paste. In the soldering zone 22, the printed circuit board is heated for a certain time to a process temperature which lies above the melting point of the solder paste, so that this melts in the soldering zone in order to solder the electronic components to the printed circuit board. In the cooling zone 24, the material for soldering is cooled so that the liquid solder solidifies before the material for soldering is removed at the exit 14 of the reflow soldering apparatus 10.

A transport system 34 is provided within the reflow soldering apparatus 10 for transporting the printed circuit boards along the transport direction 18.

As is clear from FIG. 2, the cover hood 25 can be pivoted open about a hood axis 32 extending parallel to the transport direction 18. By the cover hood 25 pivoting open, the interior of the process channel 16 and the transport system 34 become accessible so that they can be checked visually, maintained, cleaned, set up, replaced, and, if necessary, repaired.

As is further apparent from FIG. 2, the hood flaps 26 can be pivoted open about a flap axis 38 running parallel to the hood axis 32. By the hood flaps 26, 28 pivoting open, the hood compartment 30 above the process channel and thus the hood compartment 30 lying above the upper channel half become accessible in which, as shown further below, in particular fan modules 50, heating elements and air channels are provided. As is also clear from FIG. 2, the flap axis 38 is arranged vertically above the hood axis 32, namely not only when the cover hood 25 is open but also when the cover hood 25 is closed.

The soldering apparatus 10 has two longitudinal sides 42 and 44 and two narrow sides 46 and 48. As can be clearly seen in FIG. 2, the hood axis 32 is located in the region of the one rear longitudinal side 44. In contrast, the flap axis 38 is located in the region of the front longitudinal side 42 or is closer to the front longitudinal side 42 than to the rear longitudinal side 44.

Figure 3:
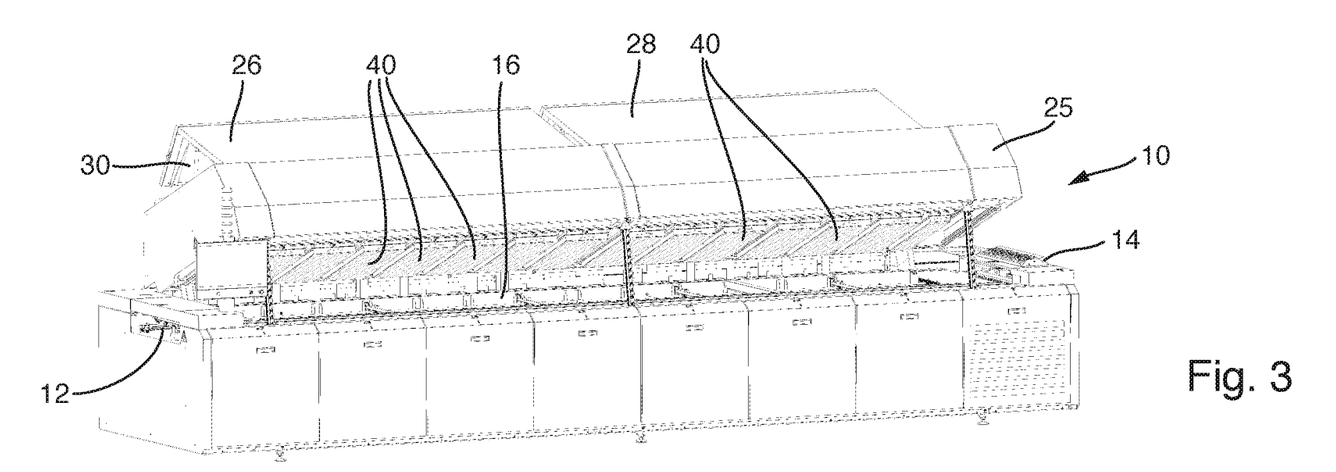
FIG. 3 the reflow soldering apparatus according to FIG. 1 from obliquely to the front with open cover hood and opened hood flaps.

In FIG. 3, in which on the one hand the cover hood 25 and on the other hand the hood flaps 26, 28 are open, the open process channel 16 can be seen in particular. The process channel 16 is formed by two channel halves: an upper channel half and a lower channel half. The lower channel half with the lower nozzle plates 40 is provided in or on a main body 60 and the upper channel half with the upper nozzle plates 40 is provided in or on the cover hood 25. The upper channel half, the upper nozzle plates 40 and further components located in the hood compartment 30 are arranged on the cover hood 25 such that they also pivot open as the cover hood 25 is opened and the process channel 16 is uncovered.

Figure 4:
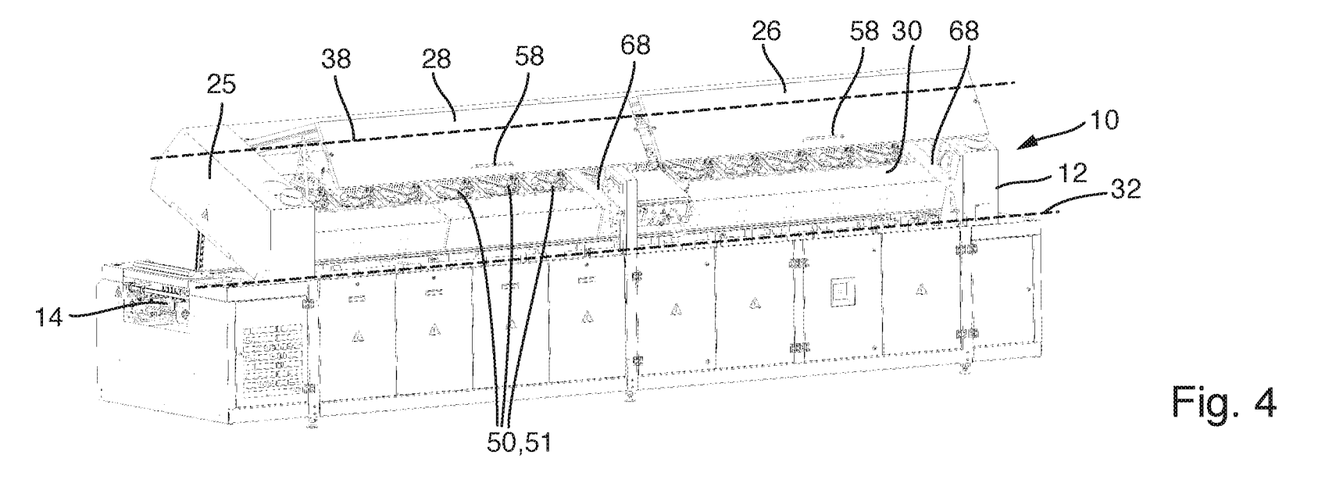
FIG. 4 the reflow soldering apparatus according to FIG. 1 from obliquely to the rear with open cover hood and opened hood flaps.

Such an arrangement ensures that, as is clear from FIGS. 2 to 4, when the cover hood 25 is open the process channel 16 is accessible from the front longitudinal side 42, and that the upper hood compartment 30 covered by the hood flaps 26, 28 is accessible from the other rear longitudinal side 44.

Among other things, this has the advantage that, when the cover hood 25 is being opened, and thus when the process channel 16 is being uncovered, gas flowing out of the process channel 16 does not flow into the upper hood compartment 30 covered by the cover flaps 26, 28. Furthermore, a plurality of operators can monitor or maintain the process channel 16 at the same time and independently thereof the hood compartment 30 covered by the cover flaps 26, 28.

Figure 5:
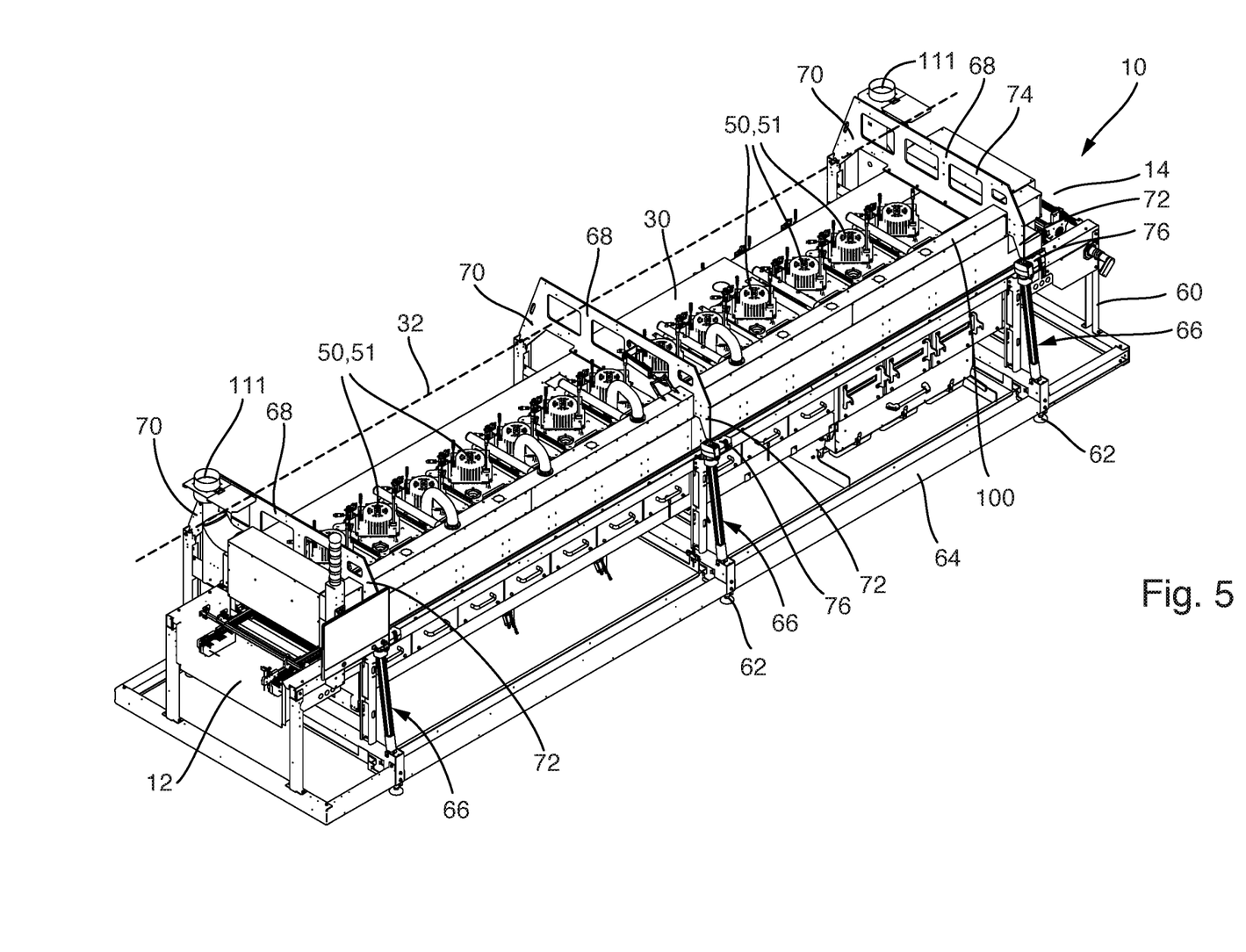
FIG. 5 the reflow soldering apparatus according to FIG. 1 from obliquely to the front without machine panels.

As is clear from FIGS. 4 and 5, a plurality of fan modules 50 with fan motors 51 are located above the upper channel half in the hood compartment 30 covered by the hood flaps 26, 28, said fan motors being provided for generating a provided air flow in the process channel 16. The fan modules 50 can additionally have heating elements in order to provide a predefined temperature in particular in the preheating zone 20 and in the process zone 22. By means of the fan modules 50 or their fan motors 51, correspondingly heated process gas is introduced through the nozzle plates 40 towards the material for soldering.

If the cover hood 25 is opened, in particular the process channel 16 and the transport system provided therein will therefore be accessible. If the hood flaps 26, 28 are opened up, in particular the fan motors 51 provided therein will be accessible together with their heating elements and also air channels provided there.

In their closed position, which is shown in FIG. 1, the two hood flaps 26, 28 have a horizontal portion 52 which is located close to the flap axis 38 and extends substantially in the horizontal direction. This horizontal portion is adjoined by a sloping portion 56 which is remote from the flap axis 38 and which with the horizontal portion 50 encloses an obtuse angle 54. As is clear in particular from FIG. 4, handles 58 for opening the two hood flaps 26, 28 are provided on the sloping portion. The obtuse angle 54 can be clearly seen in FIG. 2.

The main body 60 stands on a substrate by means of feet 62. The feet 62 are provided on a lower frame 64. Furthermore, drive units 66 are provided for the motorized opening and closing of the cover hood 25 and are braced at one end on the lower frame 64 and at the other end on the cover hood 25. As is also clear from FIG. 5, which shows the cover hood 25 without its panels, the cover hood 25 comprises portal-like frame arms 68, each of which has a first support portion 70 directed towards the hood axis 32 and a second support portion 72 directed toward the respective drive unit 66. A central portion 74 is provided between the two support portions.

Figure 6:
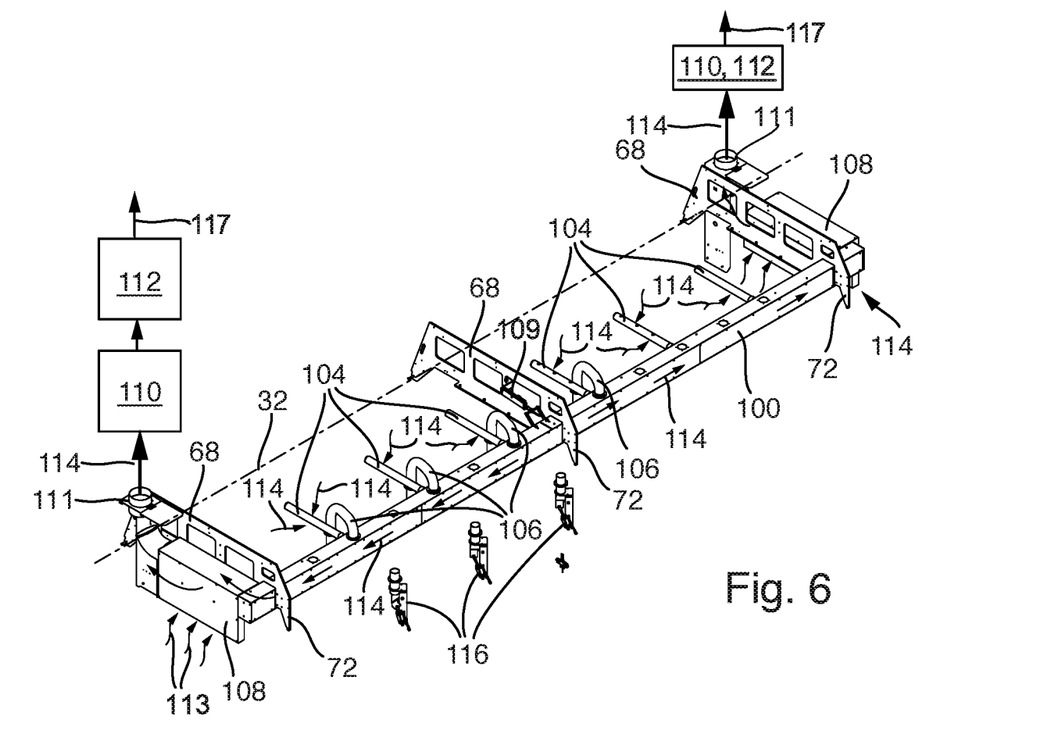
FIG. 6 the cover hood with central suction channel without panels.

As is clear from FIG. 6, a central suction channel 100 is provided over the longitudinal extent of the soldering apparatus 10 in the cover hood 25. The suction channel 100, which has a rectangular cross-section, is fastened to the frame arms 68 or connects the frame arms 68 to one another. Here the arrangement of the suction channel 100 is in the region of the support portions 72 which are remote from the hood axis 32. The suction channel 100 extending substantially parallel to the transport direction 18 stiffens the cover hood 25.

The suction channel 100 has a plurality of first suction elements 104, a plurality of second suction elements 106 and two third suction elements 108. The first and second suction elements 104 and 106 are designed as suction tubes. The two third suction elements 108 are each provided at the entry 12 and at the exit 14 of the soldering apparatus 10 and are designed as suction chambers.

A switching device 109 for switching between an operating mode and a cooling mode can be operated via the communications unit 36. In the operating mode, material for soldering is soldered in the soldering apparatus 10. In the cooling mode, in which no soldering of material for soldering takes place, in particular the preheating zone 20 and the soldering zone 22 are cooled. Here the switching device 109 can operate or comprise an actuator and also an adjustment mechanism.

In the operating mode, the heated hood compartment air 114 which is enclosed by the cover hood 25 is suctioned from the hood compartment 30 via the suction elements 104. On the other hand, process gas 113 is suctioned via the suction elements 108 in the region of the entry 12 and the exit 14, as a result of which an undesired escape of process gas 113 from the entry 12 or the exit 14 is prevented.

Figure 7:
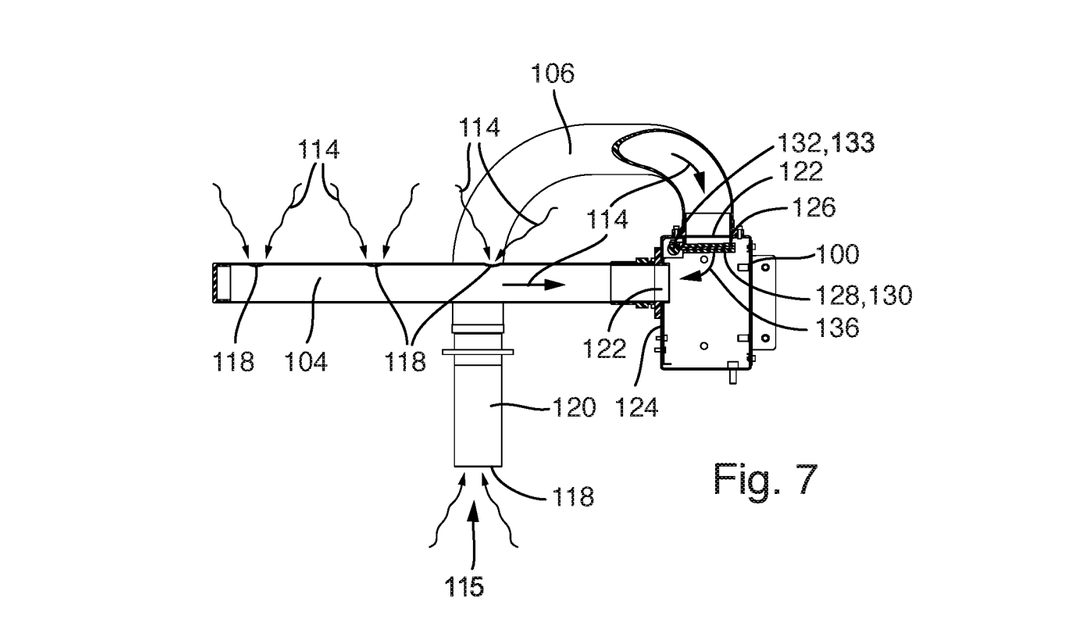
FIG. 7 a section through the central suction channel transverse to the transport direction.

In the cooling mode on the other hand, process gas 115, as can be seen from FIG. 7, is suctioned from the process channel 16 exclusively via the suction elements 106. In the cooling mode, no air is suctioned from the hood compartment 30 via the suction elements 104.

FIG. 6 schematically indicates two suction devices 110, for example in the form of fans or vacuum pumps, which can be connected to suction nozzles 111 of the soldering apparatus 110. Instead of two suction devices 110, it is also conceivable to provide only one suction device 110, which then suctions air or process gas from the two suction nozzles 111. In each case a cooling and cleaning unit 112, in which the suctioned process gas is cooled and cleaned, is connected downstream of the respective suction device 110.

The air 117 having passed through the suction device 110 and the cleaning unit 112 can be discharged into the environment. The suction devices 110 or the cleaning units 112 can be arranged outside the soldering apparatus 10.

In order to enable subsequent flow of ambient air into the soldering apparatus 110 in the cooling mode, closable suction elements 116 indicated in FIG. 6 are provided on the underside of the soldering apparatus 100. One of these suction elements 116 is shown enlarged in FIG. 9. Consequently, in cooling mode when process gas 115 is being suctioned from the process channel 16 via the suction device 110, the suction elements 116 will be activated and opened.

In the section according to FIG. 7, it can be seen that the suction channel 100 has a rectangular cross-section. Furthermore, a suction element 104 of the first type and a suction element 106 of the second type are shown. The suction elements 104 are provided in such a way that in the closed position of the cover hood 25 they run substantially horizontally and transversely to the transport direction 18. The suction elements 104 provide a plurality of suction openings 118 distributed over their longitudinal extent. Hood compartment air 114 in the region directly below the cover hood 25 or in the region of the motors 51 is finally suctioned via the suction openings 118.

The suction elements 106 of the second type are designed as curved tubes or hoses and each have a suction opening 118 which, when the cover hood 25 is closed, is located in the region of the process channel 16 and in the cooling mode suctions process gas 115 from the process channel 16. The suction elements 106 have an end portion 120 which extends in the vertical direction so that the suction opening 118 adjoins or extends into the process channel.

As is clear from FIG. 7, the suction elements 104 and 106 each have a tube mouth 122 which opens out into the central suction channel 100. The tube mouths 122 of the two suction elements 104 and 106 are also in each case located on adjacent channel walls 124, 126. The tube mouths 122 of the different suction tubes 104 and 106 are in each case located, as is also clear from FIG. 7, within a sectional plane running perpendicular to the longitudinal axis of the suction channel 100.

Furthermore, closure elements 128 in the form of pivoting flaps 130 are provided in the suction channel 100. The pivoting flaps 130 can be pivoted between different positions about a pivot axis 132 running parallel to the axis of the suction channel 100 or to the transport direction 18. In the first pivot position shown in FIG. 7, which is assumed in the operating mode, the pivoting flap 130 closes the tube mouth 122 of the suction element 106 and the tube mouth 122 of the suction element 104 is open. Hood compartment air 114 can consequently be suctioned.

In a second position, in the cooling mode, the pivoting flap 130 is pivoted in the direction of the arrow 136 until it closes the tube mouth 122 of the suction tube 104. In this position, process gas 115 can be suctioned from the process channel 16 solely via the respective suction element 106.

As is clear from FIG. 6, a total of six first suction elements 104 and four second suction elements 106 are provided. Six closure elements 128, with which the individual tube mouths 122 are closed, are then preferably provided within the suction channel 100. Furthermore, it is advantageous if a common control of the closure elements 128 or pivoting flaps 130 is effected via the switching device 109. It is conceivable that a control shaft 133 which can be operated by the switching device 109 is provided, on which control shaft the individual pivoting flaps 130 are provided in a rotationally fixed manner.

Figure 8:
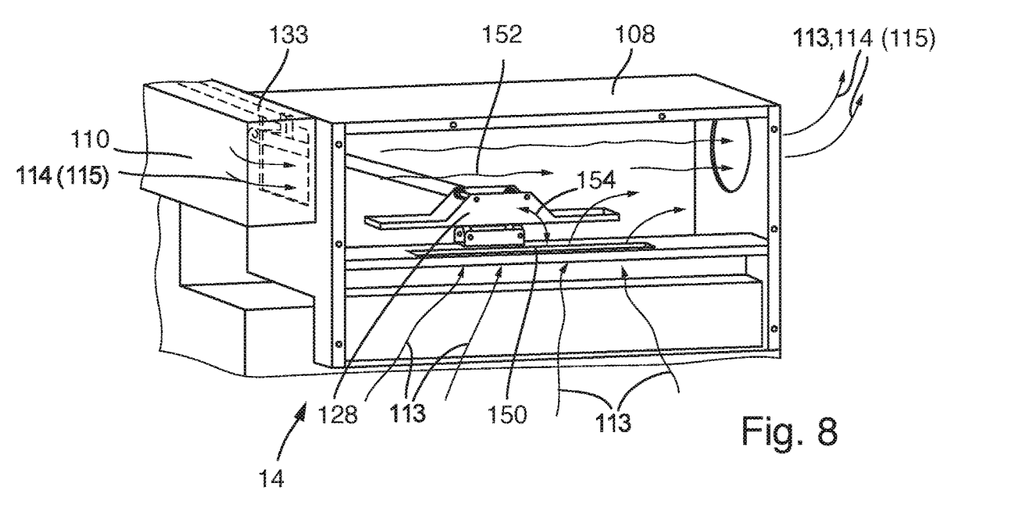
FIG. 8 a section through a third suction element transverse to the transport direction.

FIG. 8, which shows a section transverse to the transport direction 18 and through a third suction element 108 at the exit 14, clearly shows that the suction elements 108 are passed through by the suctioned hood compartment air 114 or by the suctioned process gas 115 and have an inflow opening 150 that can be closed with a closure element 128. The closure element 128 is motion-coupled to the drive shaft 133 by means of a mechanism 152 in such a way that in the operating mode the inflow opening 150 is open and in the cooling mode the inflow opening 150 is closed. Here the closure element 128 is displaceable along the arrow 154 towards the inflow opening 150. Consequently, the suction elements 104 and 108 can be simultaneously closed or opened via the switching device 109 or the control shaft 133 connected thereto.

Figure 9:
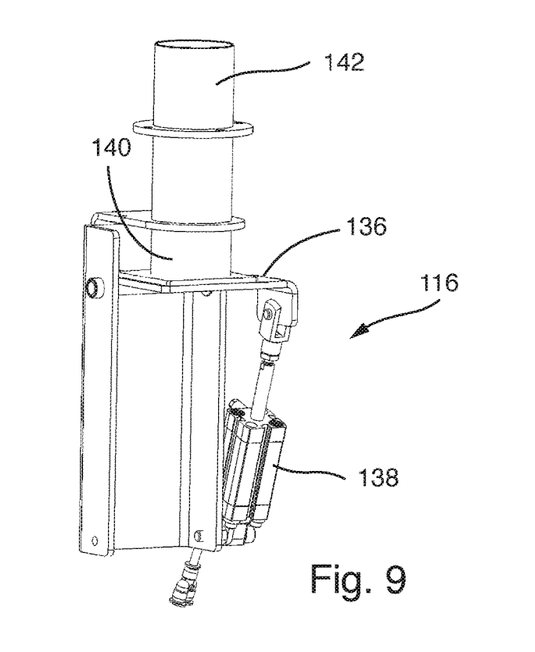
FIG. 9 a closable suction element as an individual part.

Suction elements 116, as shown in FIG. 9, are preferably installed in the lower region of the soldering apparatus 10 that is close to the base. The individual suction elements 116 provide a flap 136 which can be adjusted between an open position and a closed position via an adjusting element 138. A suction tube 142, which preferably opens out into the process channel 16, is connected to the flap 136.

In FIG. 9, which shows the suction elements 116 in the operating mode, the flap 136 and thus the suction tube 142 are closed. In the operating mode, no fresh air is suctioned through the suction elements 116 in order to obtain a predefined temperature profile within the soldering apparatus. It is rather the case that, in the operating mode, gas, in particular nitrogen, is specifically introduced into the soldering apparatus 10 in order to prevent in particular oxidation at solder joints during the soldering process. In the cooling mode, the respective suction element 116 is in the open position in which the respective flap 136 is open, so that fresh air for cooling can flow into the process channel 16 via the free end 140 of the respective suction tube 142.

When switching into the cooling mode, the adjusting elements 138 are thus controlled such that the flaps 136 are opened. When switching into the operating mode, the adjusting elements of 138 are controlled such that the flaps 136 are closed.

With the soldering apparatus 10 described, in particular when a profile change is imminent, process gas 115 can be suctioned via the central suction channel 100 from the process channel 16 or the preheating zone 20 and/or the process zone 22. As a result, a rapid and reliable cooling in particular of the preheating zone 20 and the process zone 22 can be effected.

What is claimed is:

1. Soldering apparatus for the continuous soldering of printed circuit boards along a transport direction,
    with an entry and an exit for feeding and removing the printed circuit boards, with a process channel comprising a preheating zone, at least one of a soldering zone and a cooling zone, with a main body and with at least one cover hood which can be displaced between a closed position and an open position,
    wherein the cover hood encloses a hood compartment which is located above the process channel and in which fan motors are provided, characterized in that a central suction channel that extends substantially parallel to the transport direction and is configured to stiffen the cover hood is provided in the hood compartment, in that first suction elements connected to the suction channel in the hood compartment are provided for the suction of hood compartment air from the hood compartment, in that second suction elements connected to the suction channel in the hood compartment are provided for the suction of process gas from the process channel, and in that a switching device is provided and is configured to switch between an operating mode in which hood compartment air is suctioned via the first suction elements and a cooling mode in which process gas is suctioned via the second suction elements.

2. Soldering apparatus according to claim 1, characterized in that third suction elements are provided at the entry and/or the exit, and in that the switching device is provided and configured such that in the operating mode process gas is suctioned from a region of the entry and/or of the exit via the third suction elements and such that in the cooling mode no process gas is suctioned via the third suction elements.

3. Soldering apparatus according to claim 1, characterized in that the first suction elements are designed as suction tubes with suction openings, the suction openings being provided in a region of an underside of the cover hood and the fan motors.

4. Soldering apparatus according to claim 1, characterized in that in the closed position of the cover hood the first suction elements have a portion extending substantially horizontally and/or transversely to the transport direction, said portion having a plurality of suction openings over the longitudinal extent thereof.

5. Soldering apparatus according to claim 1, characterized in that the second suction elements are designed as suction tubes with suction openings, wherein in the closed position of the cover hood the suction openings lie in a region of the process channel.

6. Soldering apparatus according to claim 1, characterized in that in the closed position of the cover hood the second suction elements have a substantially vertically extending end portion with an open free end, said end portion being provided in the process channel or adjacent to the process channel.

7. Soldering apparatus according to claim 1, characterized in that tube mouths of the first suction elements and tube mouths of the second suction elements in each case open adjacently into the suction channel, and that the switching device comprises closure elements and/or operates the closure elements in such a way that in the operating mode these close the tube mouths of the second suction elements and in the cooling mode close the tube mouths of the first suction elements.

8. Soldering apparatus according to claim 7, characterized in that the respective closure element is configured as a pivoting flap which can be adjusted about an adjustment axis.

9. Soldering apparatus according to claim 7, characterized in that the switching device comprises or operates a controllable actuator and/or an adjustment mechanism via which a plurality of closure elements can be adjusted together.

10. Soldering apparatus according to claim 1, characterized in that suction elements are provided which are switchable between an open position and a closed position and which can be controlled in such a way that in the operating mode the suction elements are closed and in such a way that in the cooling mode the suction elements are open.

* * * * *